United States Patent
Ota

(10) Patent No.: US 9,108,551 B2
(45) Date of Patent: Aug. 18, 2015

(54) SEAT STRUCTURE MEMBER AND VEHICLE SEAT

(71) Applicant: TOYOTA BOSHOKU KABUSHIKI KAISHA, Aichi-ken (JP)

(72) Inventor: Hiroki Ota, Inazawa (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 13/858,184

(22) Filed: Apr. 8, 2013

(65) Prior Publication Data

US 2013/0264857 A1    Oct. 10, 2013

(30) Foreign Application Priority Data

Apr. 9, 2012 (JP) ................................. 2012-088199

(51) Int. Cl.
| | |
|---|---|
| A47C 7/74 | (2006.01) |
| B60N 2/56 | (2006.01) |
| B60N 2/70 | (2006.01) |

(52) U.S. Cl.
CPC .............. B60N 2/5657 (2013.01); A47C 7/744 (2013.01); B60N 2/7017 (2013.01)

(58) Field of Classification Search
CPC .............................. B60N 2/5657; A47C 7/744
USPC ......................... 297/452.47, 180.14
See application file for complete search history.

(56) References Cited

U.S. PATENT DOCUMENTS

| | | | | |
|---|---|---|---|---|
| 6,179,706 | B1 * | 1/2001 | Yoshinori et al. | 297/180.14 |
| 6,685,553 | B2 * | 2/2004 | Aoki | 297/180.14 |
| 6,848,742 | B1 * | 2/2005 | Aoki et al. | 297/180.14 |
| 7,287,812 | B2 * | 10/2007 | Ishima et al. | 297/180.14 X |
| 7,322,643 | B2 * | 1/2008 | Ishima et al. | 297/180.14 |
| 7,931,330 | B2 * | 4/2011 | Itou et al. | 297/180.14 |

FOREIGN PATENT DOCUMENTS

| | | | | |
|---|---|---|---|---|
| DE | 102011011504 A1 * | 8/2012 | | B60N 2/5657 |
| JP | 2008-142244 | 6/2008 | | |
| WO | WO 2008043416 A2 * | 4/2008 | | B60N 2/5657 |

* cited by examiner

*Primary Examiner* — Anthony D Barfield
(74) *Attorney, Agent, or Firm* — Greenblum & Bernstein, P.L.C.

(57) ABSTRACT

A cover has a breathable first portion arranged on a seating side of a seat structure member, a second portion that is laminated to the first portion and inhibits penetration of resin foam material, and a passage portion through which air passes that is provided on the second portion. A protruding portion is arranged face-to-face with the passage portion while the cover is arranged in a cavity, and the cushion is formed with an interposed member that is less rigid than the cover being interposed between the passage portion and the protruding portion.

16 Claims, 7 Drawing Sheets

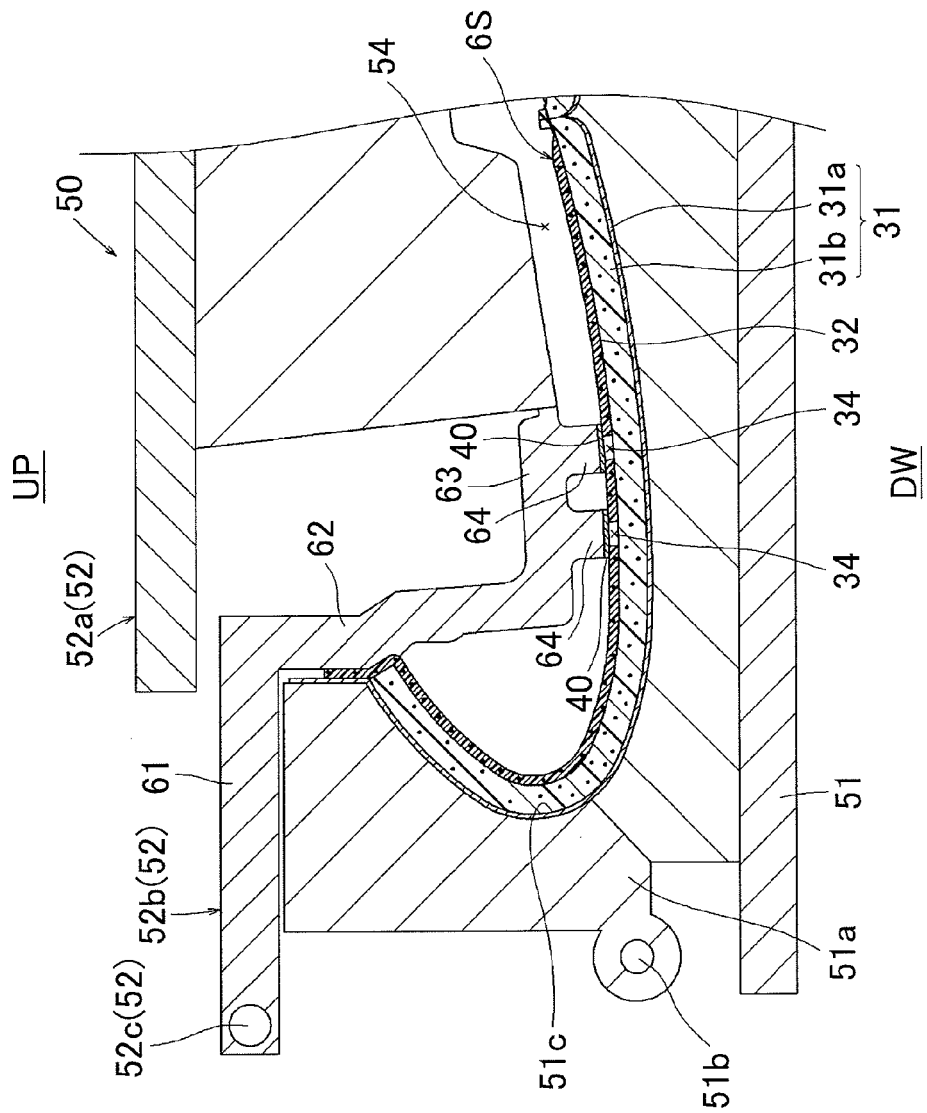

SEAT STRUCTURE MEMBER AND VEHICLE SEAT

INCORPORATION BY REFERENCE

The disclosure of Japanese Patent Application No. 2012-088199 filed on Apr. 9, 2012 including the specification, drawings and abstract is incorporated herein by reference in its entirety.

BACKGROUND OF THE INVENTION

1. Field of the Invention

The invention relates to a seat structure member provided with a blowing apparatus, a cushion capable of elastically supporting an occupant, and a flow path portion (i.e., a portion through which air from the blowing apparatus is able to pass) of the cushion, as well as to a vehicle seat.

2. Description of Related Art

Japanese Patent Application Publication No. 2008-142244 (JP 2008-142244 A) describes one such known vehicle seat that has a seat cushion and a seat back. The seat cushion and the seat back (both seat structure members) each have a cushion and a cover. The cover is a bag-like member capable of covering the cushion, and is made of breathable cloth material (such as fabric). The cushion is an elastic member (made of resin foam) that forms the outer shape of the seat, and is formed by a molding apparatus (a first die, a second die, and a cavity). Here, the first die and the second die are mold members that are able to be closed together. Also, the cavity is a void that follows the shape of the cushion, and is formed between the first die and the second die. With this related art, the cover is arranged between the first die and the second die (i.e., in the cavity), and then resin foam material is expanded inside the cavity. As a result, the cushion is integrated with the cover while it is being formed. At this time, the cover is vacuum suctioned so that it is pressed against the inside surface of the first die (i.e., the cover is tightly compressed), which enables impregnation of the resin foam material to be inhibited as much as possible.

With the vehicle seat described above, a blowing apparatus is mounted to the seat structure member, such that air is able to be blown toward the occupant. At this time, a flow path portion (i.e., a portion that passes through the cushion in the thickness direction) is provided in the cushion, which enables air from the blowing apparatus to pass through. Arranging the blowing apparatus on the back surface side of the cushion while communicating it (i.e., the blowing apparatus) with the flow path portion enables air blown out from the blowing apparatus to be blown to the cover side (i.e., toward the occupant) through the flow path portion of the cushion.

Here, the flow path portion is formed at the same time that the cushion is formed, using the molding apparatus described above (see FIG. 8). For example, a protruding portion 64a (i.e., a portion that follows the outer shape of the flow path portion) is formed. Next, the protruding portion 64a is pressed against a cover Sa while being made to protrude toward the inside surface of the first die, by closing the first die and the second die together. In this state, the resin foam material is expanded, such that a cushion Pa is able to be formed while a flow path portion 20a (a void) is formed by the protruding portion 64a.

With the structure described above, there are cases in which the protruding portion 64a presses excessively on the cover Sa, such that a portion of the cover Sa deforms inward (i.e., becomes recessed) toward the first die (see the portion outlined by the circle in FIG. 8A). The resin foam material then enters the space (that has a generally triangular shape) between the recessed location of the cover Sa and the protruding portion 64a. As a result, a portion of the cushion Pa may be formed protruding toward the cover Sa side (i.e., a thorn-shaped protruding portion Px may be formed). Therefore, with this structure, the protruding portion Px (a portion that feels like a foreign body) is formed on the cushion Pa, and this protruding portion Px may cause the cover Sa to rise up (i.e., results in a structure with somewhat diminished seat performance). The invention integrates the cover and the cushion having a flow path portion with good performance.

SUMMARY OF THE INVENTION

One aspect of the invention relates to a vehicle seat that includes a seat structure member, and a blowing apparatus that is arranged on the seat structure member. The seat structure member includes a cushion made of resin foam material, a flow path portion of the cushion, through which air passes, and a cover that covers the cushion. Air that is blown from the blowing apparatus is blown to the cover side via the flow path portion. Also, in this aspect, the cushion described above is formed inside the cavity of the molding apparatus, and the flow path portion is formed by the protruding portion that is arranged inside the cavity. It is desirable that with this kind of aspect, the cover and the cushion that has the flow path portion are able to be integrated with good performance.

Thus, in this aspect, the cover has a breathable first portion arranged on a seating side of the seat structure member, a second portion that is laminated to the first portion and inhibits penetration of the resin foam material, and a passage portion through which air passes that is provided on the second portion. Inhibiting penetration of the resin foam material by the second portion as much as possible in this way enables the cover and the cushion to be integrated while maintaining the original properties (bendability and the like) of the cover to the utmost extent possible. Also, in this aspect, the protruding portion is arranged face-to-face with the passage portion, while the cover is arranged in the cavity, and the cushion is formed with the interposed member that is less rigid than the cover being interposed between the passage portion and the protruding portion. According to this aspect, the cover is able to be integrated with the cushion, while inward deformation of the cover is inhibited (i.e., while improving performance) by the interposed member. That is, the cover and the cushion that has the flow path portion are able to be integrated with good performance.

Also, in the vehicle seat of the aspect described above, the interposed member may have a facing portion that is face-to-face with the passage portion, and a rigidity of the facing portion may be set lower than that of another portion of the interposed member, excluding the facing portion. As a result, inward deformation of the cover is able to be even more reliably suppressed. That is, the cover and the cushion that has the flow path portion are able to be integrated with even better performance.

In the vehicle seat having the structure described above, the facing portion described above may be larger than the passage portion. As a result, the passage portion is reliably covered by the facing portion and the like, so leakage of the resin foam material from the passage portion, and deterioration in performance of the cover are able to be inhibited to the greatest extent possible. That is, the cover and the cushion that has the flow path portion are able to be even more reliably integrated with good performance. Also, the seat structure member may be a seat cushion and/or a seat back.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a sectional view of a portion of a molding apparatus after a mold is closed;

DETAILED DESCRIPTION OF EMBODIMENTS

Figure 1:
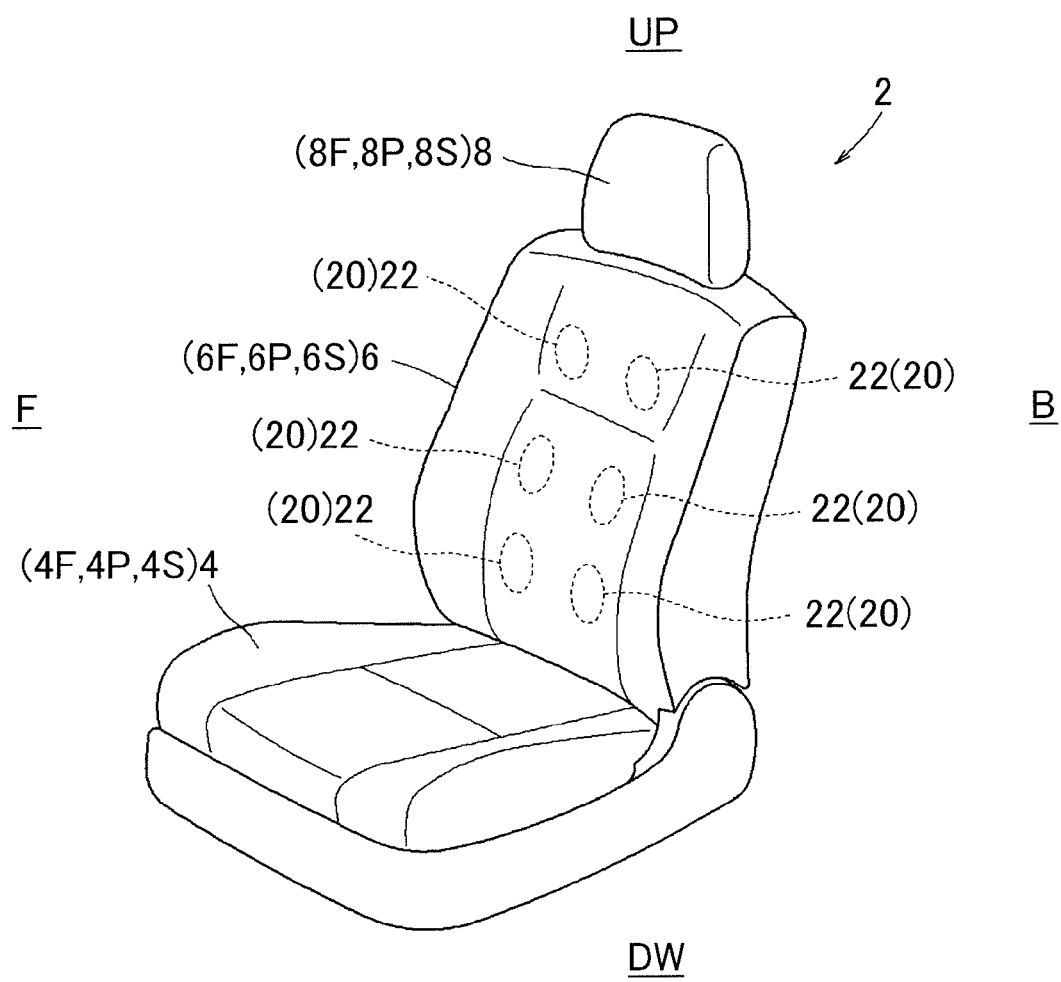
FIG. 1 is a perspective view of a vehicle seat.

Hereinafter, example embodiments of the invention will be described with reference to FIGS. 1 to 7. In the drawings, reference character F denotes a forward direction with respect to each member, reference character B denotes a rearward direction with respect to each member, reference character UP denotes an upward direction with respect to each member, and reference character DW denotes a downward direction with respect to each member, as appropriate. A vehicle seat 2 in FIG. 1 has a seat cushion 4, a seat back 6, and a headrest 8. These seat structure members each have a frame member (4F, 6F, 8F) that forms a seat frame, a cushion (4P, 6P, 8P) that forms the outer shape of the seat, and a cover (4S, 6S, 8S) that covers the cushion. Here, the frame members (4F, 6F) are frame bodies that typically have a generally rectangular shape, and support the cushions (4P, 6P).

The seat back 6 has the structures described above (6F, 6P, 6S), a blowing apparatus 10, and a flow path portion 20 (each of these members will be described in detail later; see FIGS. 1 and 2). In this example embodiment, the blowing apparatus 10 is mounted to the seat back 6 and communicated with the flow path portion 20 in the seat back 6. Air blown from the blowing apparatus 10 is able to be blown at an occupant via the flow path portion 20. Also, when forming the cushion 6P in a cavity 54 of a molding apparatus 50 (that will be described in detail later), the flow path portion 20 is formed by a protruding portion 64 arranged inside the cavity 54, as will be described later (see FIGS. 4 and 5). It is desirable that with this type of structure, the cover 6S and the cushion 6P that has the flow path portion 20 are able to be integrated with good performance. Therefore, in this example embodiment, the cover 6S and the cushion 6P are integrated with good performance by the structure (a interposed member 40) described later. Each of the structures will be described in detail below.

Figure 2:
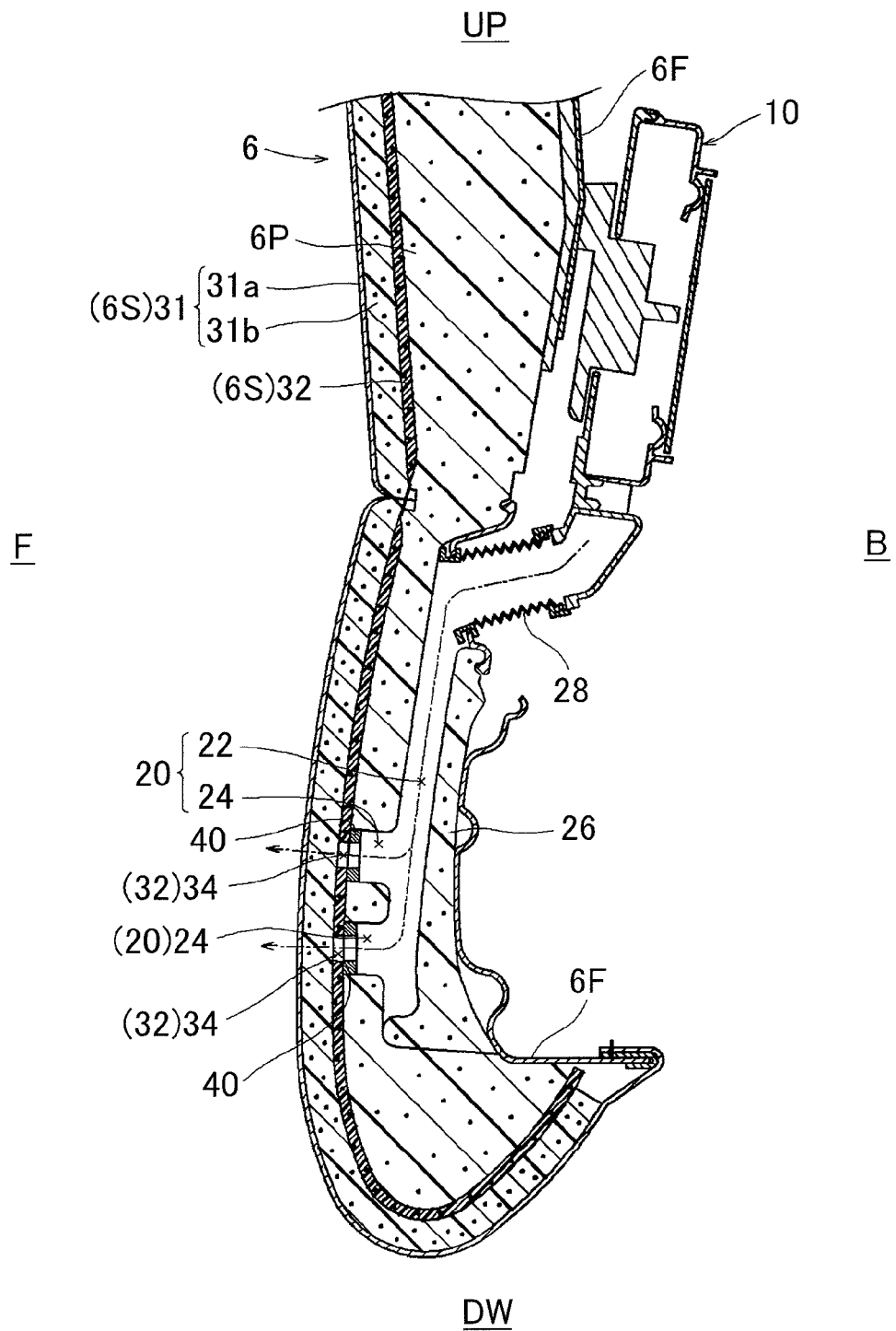
FIG. 2 is a sectional view of a portion of a seat back.

The blowing apparatus 10 in this example embodiment is a hollow case (having a short cylindrical shape), and houses a blowing mechanism (see FIG. 2). A centrifugal type mechanism (i.e., a mechanism that blows out air in a centrifugal direction while drawing air in from an axial direction of the apparatus) may be used for the blowing mechanism. Some possible examples of this type of blowing mechanism are a multi-blade fan (a sirrocco fan), a plate fan, a turbo fan, an airfoil fan, and a limit load fan.

The cushion 6P is a generally rectangular member that forms the outer shape of the seat, and includes a flow path portion 20 and a lid member 26 that will be described later (see FIGS. 1 and 2). Here, the material of the cushion 6P is not particularly limited, but polyurethane foam (density: 10 $kg/m^3$ to 60 $kg/m^3$) is one possible example. The cushion 6P of the example embodiment (in an upright state) is such that an end portion (an upper end portion or a lower end portion or the like) tilts toward the rear of the seat. Also, on a surface opposite the seating surface, a recessed portion (i.e., an accommodating portion) is formed in the center of the cushion 6P. The recessed portion is recessed toward the seating side with respect to end portions of the surface opposite the seating surface. The recessed portion (i.e., the accommodating portion) is able to accommodate the blowing apparatus 10. The back surface side of the cushion 6P (i.e., the accommodating portion) is covered by a board member (made of resin).

The flow path portion 20 is a flow path that leads air blown from the blowing apparatus 10 to the seating side, and includes a groove 22 and a plurality of holes 24 (see FIG. 2). The groove 22 is a generally H-shaped (when viewed from the front) recessed portion, and is formed in the back surface (in the accommodating portion) of the cushion 6P. Also, the plurality of holes 24 are through-holes that extend through the cushion 6P in a thickness direction, with one end side open to the seating side and the other end side open to the groove 22. Also, the lid member 26 is a generally rectangular (when viewed from the front) member that is able to cover the groove 22, and is typically made of material (such as resin foam) that is non-breathable or has low air permeability.

Figure 6:
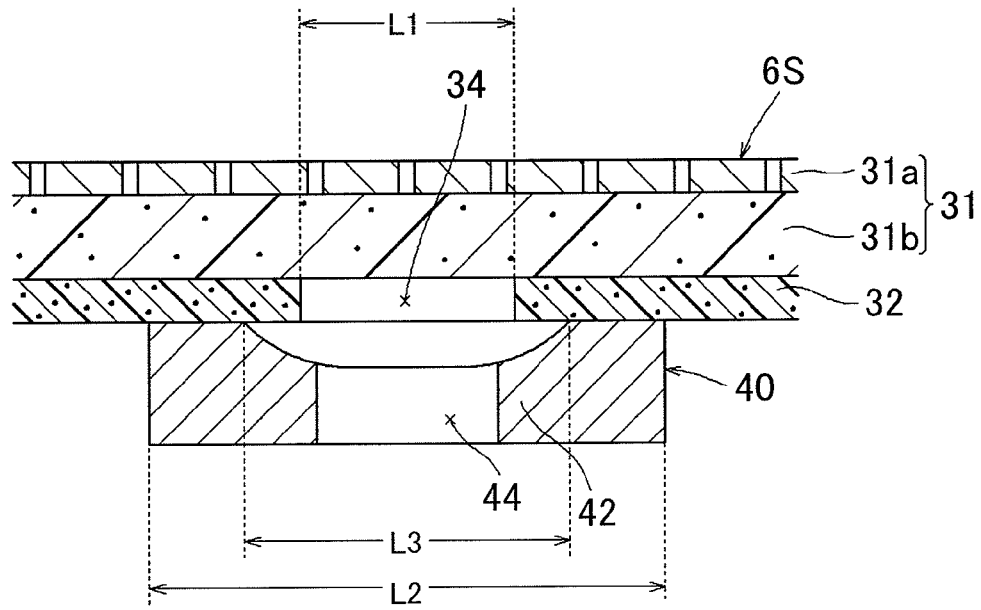
FIG. 6 is a sectional view of the interposed member and a cover.
Figure 7:
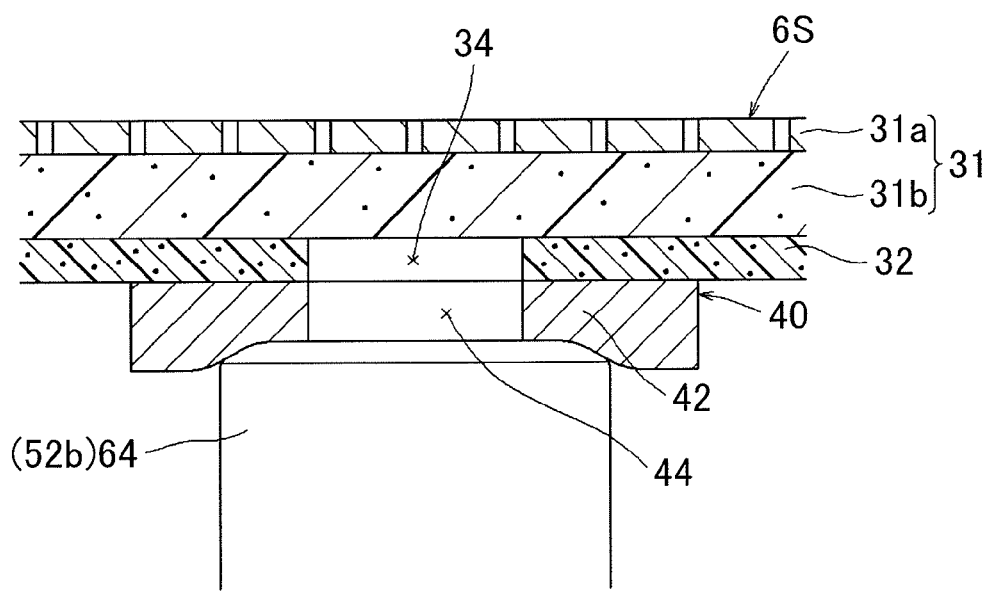
FIG. 7 is a sectional view of the interposed member and the cover after the mold is closed.
Figure 8A:
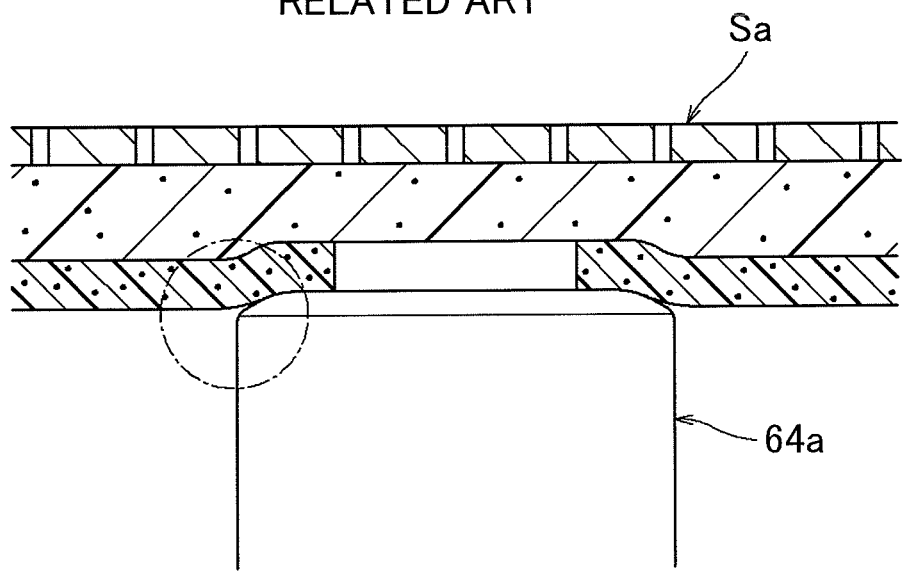
FIG. 8A is a sectional view of a protruding portion and a cover after a mold is closed according to related art.
Figure 8B:
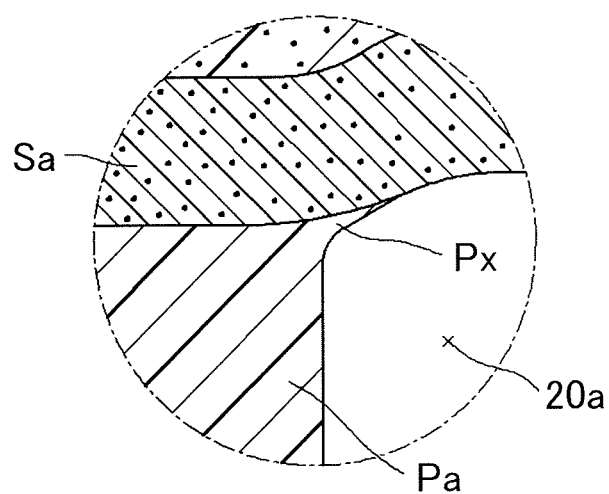
FIG. 8B is a partial sectional view of a cushion and a cover according to the related art.

The cover 6S is a bag-like member that is able to cover the cushion 6P (see FIGS. 2, 6, and 7). The cover 6S in this example embodiment includes a first portion 31, and a second portion 32 (a passage portion 34). The first portion 31 is a breathable portion that is arranged on the seating side of the cover 6S. Also, the second portion 32 is a portion that is arranged on the back surface side of the cover 6S, and is able to inhibit penetration of the resin foam material of the cushion 6P during molding.

The first portion 31 includes facing material 31a and breathable material 31b (see FIGS. 6 and 7). The facing material 31a is a portion that forms the seating side of the cover 6S, and is made of leather (natural leather or synthetic leather) having through-holes, or breathable fabric (woven, knit, or non-woven). Also, the breathable material 31b is a breathable planar portion that is arranged on the back surface of the facing material 31a. Possible examples of the material of the breathable material 31b are highly breathable slab urethane (air permeability: 200 $cc/cm^2$ per second to 400 $cc/cm^2$ per second), cotton material, and a 3D net body (i.e., a member in which fiber is woven in a three-dimensional shape).

The second portion 32 is a portion that is laminated to the first portion 31 and inhibits penetration of the resin foam material of the cushion 6P, and includes the passage portion 34 (see FIGS. 6 and 7). The second portion 32 is made of material that is able to inhibit penetration of the resin foam material (molten resin) of the cushion 6P. Some possible examples of this kind of material are slab urethane with low air permeability (air permeability: 0 $cc/cm^2$ per second to 10 cc/cm² per second), fabric, leather, or a resin layer (film). Also, the passage portion 34 is a generally round hole (diameter dimension L1) that passes through the second portion 32 in the thickness direction. In this example embodiment, a plurality of the passage portions 34 (that have generally circular shapes) are able to be formed at appropriate intervals in the second portion 32.

Figure 3A:
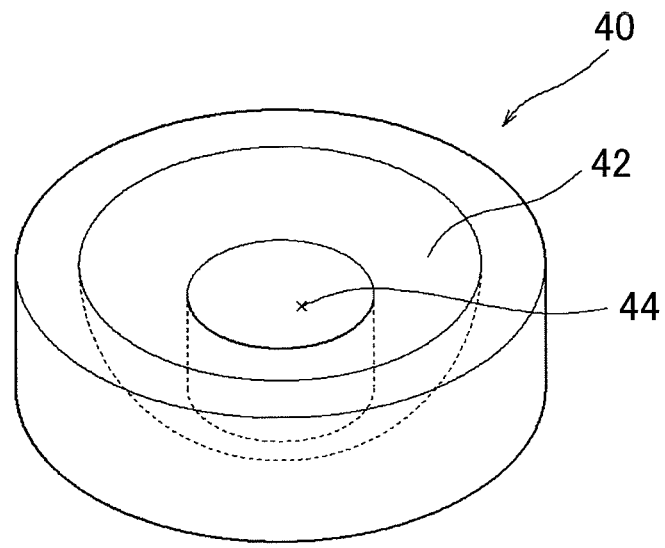
FIG. 3A is a perspective view of an interposed member according to an example embodiment of the invention.
Figure 3B:
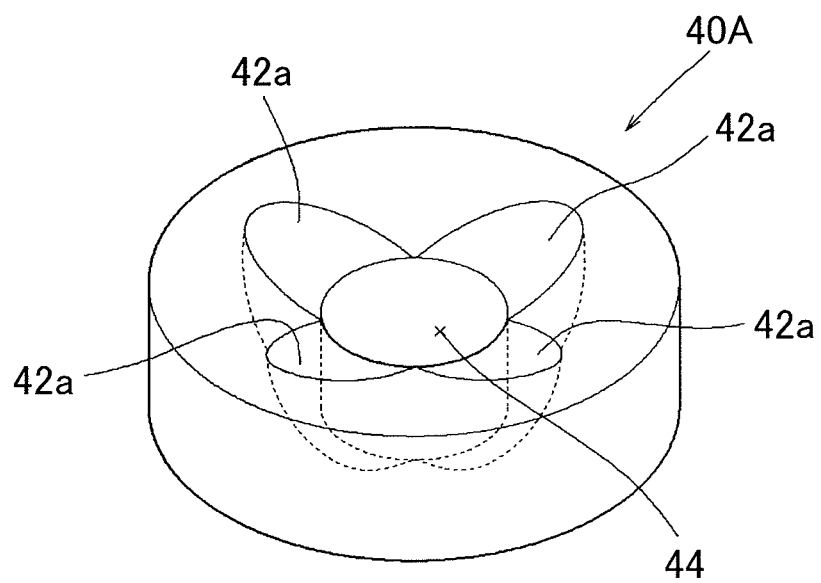
FIG. 3B is a perspective view of the interposed member according to a modified example of the example embodiment.

The interposed member 40 is a member that is able to cover the passage portion 34 from the side opposite the seating side, and is made of material that is less rigid than the cover 6S (see FIGS. 3A, 6, and 7). A member in which 25% ILD (hardness) is equal to or less than 50 N may be used as this type of interposed member 40 (measurable in compliance with JIS K 6400). The material of the interposed member 40 is not particularly limited. Some possible examples are resin foam (sponge-like) such as slab urethane, and polyurethane foam of the same material as the cushion 6P. The interposed member 40 of this example embodiment is a generally cylindrical member that is larger than the passage portion 34 (diameter dimension L2; L2>L1), and has a facing portion 42 and an air flow hole 44 (see FIG. 6). The facing portion 42 is a portion that is face-to-face with the passage portion 34, and is less rigid than other portions of the interposed member 40. The facing portion 42 of this example embodiment is a bowl-shaped portion (a thin circular portion), and is less rigid than other portions of the interposed member 40. In this example embodiment, a diameter dimension L3 of the facing portion 42 is set larger than that of the passage portion 34, which makes it possible to more reliably cover the passage portion, and thus better inhibit the resin foam material of the cushion 6P from leaking out. Also, the air flow hole 44 is a hole that passes through the interposed member 40 in the thickness direction, and is formed in the center of the facing portion 42.

Here, the interposed member may have any of a variety of structures other than the structure described above (see FIG. 3B). For example, with an interposed member 40A according to a modified example, a plurality of bowl-shaped portions 42a (that have generally semielliptical shapes when viewed from above) are formed around the air flow hole 44, and together form a single facing portion. The bowl-shaped portions 42a may be arranged at generally 90° intervals, for example, around the air flow hole 44. Having the facing portion be formed by the plurality of bowl-shaped (thin) portions 42a in this way enables the rigidity to be lower than that of other portions of the interposed member 40A.

Figure 5:
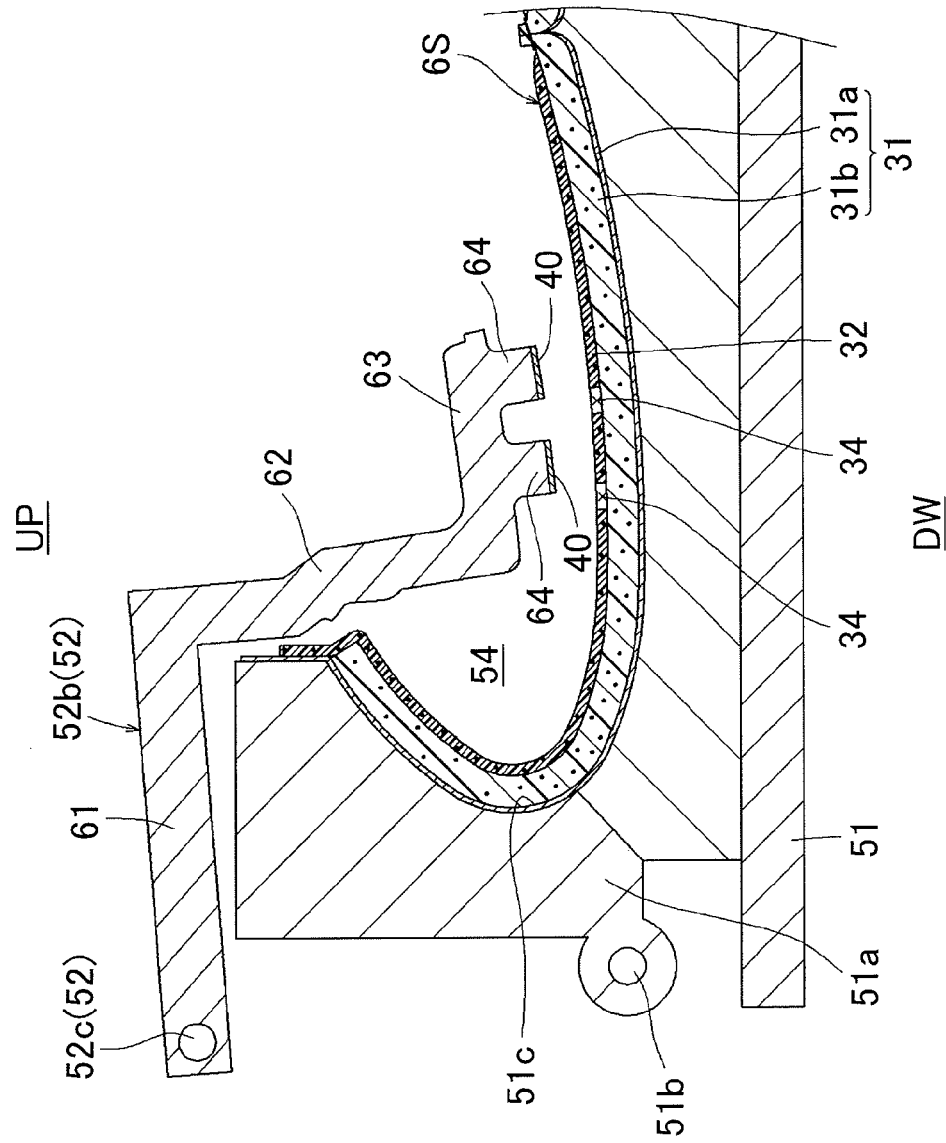
FIG. 5 is a sectional view of a portion of the molding apparatus while the mold is in the middle of being closed.

The cushion 6P may be formed using the molding apparatus 50 (i.e., a first die 51, a second die 52, and a cavity 54) (see FIGS. 4 and 5). The first die 51 and the second die 52 (both of which will be described in detail later) are mold members that can be closed together. Also, the cavity 54 is a void that follows the outer shape of the cushion 6P, and is formed between the first die 51 and the second die 52 (when the mold is closed).

The first die 51 includes a complementary die 51a, a first shaft portion 51b, and a recessed portion 51c, and becomes an overall generally rectangular member when complimented with the complementary die 51a (see FIG. 4). The recessed portion 51c of the first die 51 (when complimented with the complementary die 51a) is an indented portion in the center of the first die 51, and has a shape following the surface shape of the cushion 6P. Also, the complementary die 51a is a generally rectangular member (i.e., a member that follows the shape of a side portion of the first die) in a sectional view. In this example embodiment, the first shaft portion 51b (that is rod-shaped) is arranged in a side lower portion of the first die 51, and the complementary die 51a is rotatably attached to the side portion of the first die 51 via the first shaft portion 51b.

Then the complementary die 51a is able to be displaced between a complementary state that complements the first die 51, and an open state in which it separates from the first die 51 with the first shaft portion 51b as the rotational axis. In the open state, the complementary die 51a is open substantially horizontally after rotating about the shaft member (i.e., after separating from the first die 51).

Also, the second die 52 is a member that is able to close together with the first die 51, and includes a first movable die 52a, a second movable die 52b, and a second shaft portion 52c (that is rod-shaped) (see FIG. 4). The first movable die 52a is a generally rectangular member, and is able to be raised and lowered (move toward or away from the second die 52) in the vertical direction. A back surface of the first movable die 52a has a shape that follows the shape of the back surface (a portion of the center portion) of the cushion 6P. Also, the second movable die 52b (that will be described in detail later) is a crank-shaped (in a section view) member. A back surface of this second movable die 52b has a shape that follows the shape of the back surface (exclusively the side portion) of the cushion 6P. In this example embodiment, the second shaft portion 52c is arranged on a side upper portion of the first die 51, and the second movable die 52b is attached so as to be able to rotate about the second shaft portion 52c. By rotating the second movable die 52b about the second shaft portion 52c, the second movable die 52b is able to be displaced between a housed state in which it is arranged inside the first die 51 (i.e., the recessed portion 51c), and a state in which it is extracted from inside the first die 51.

Here, the second movable die 52b of this example embodiment has a crank shape (i.e., a shape in which it extends into the recessed portion, and then extends toward the first die), and has a first flat plate portion 61, a second flat plate portion 62, a third flat plate portion 63, and protruding portions 64 (see FIGS. 4 and 5). The first flat plate portion 61 is a flat plate portion that extends linearly from the second shaft portion 52c, and is able to be lowered and raised with respect to the first die 51 (the upper surface), with the second shaft portion 52c as the rotational axis. Also, the second flat plate portion 62 is a portion that is bent at a right angle from an end portion of the first flat plate portion 61. One surface side (the side facing the complementary die 51a) of the second flat plate portion 62 has a shape that follows the shape of the back surface (a side portion) of the cushion 6P). The second flat plate portion 62 extends perpendicularly toward the recessed portion 51c when the second movable die 52b is placed in the housed state. Also, the third flat plate portion 63 is a portion that is bent at a right angle from an end portion of the second flat plate portion 62, and has a shape that follows the shape of the back surface (another portion of the center portion) of the cushion 6P. When the second movable die 52b is placed in the housed state, the third flat plate portion 63 abuts against the first movable die 52a while extending toward the center of the recessed portion 51c. Also, when the back surface of the third flat plate portion 63 and the back surface of the first movable die 52a are flush, the shape follows the shape of the back surface of the cushion 6P. The plurality of protruding portions 64 are round cylindrical portions that follow the flow path portions 20. When the second movable die 52b is placed in the housed state, the plurality of protruding portions 64 are arranged protruding from the third flat plate portion 63 toward the first die 51 (i.e., arranged so as to be able to abut against the cover 6S).

Referring to FIGS. 4 to 7, the cushion 6P is integrated with the cover 6S while the cushion 6P is formed, by the molding apparatus 50. In this example embodiment, the cover 6S is affixed to the back surface of the first die 51 while arranged in the cavity 54 (see FIG. 5). At this time, the second portion 32 (i.e., the passage portion 34) is exposed on the cavity 54 side, while the first portion 31 (i.e., the facing material 31a) is abutted against the first die 51. Next, the second movable die 52b is rotated about the second shaft portion 52c and closed together with the first die 51, and then the first movable die 52a is lowered and closed together with the first die 51 (see FIG. 4). At this time, the second flat plate portion 62 is arranged in the recessed portion 51c, while the first flat plate portion 61 is brought down to the first die 51 side. Then the third flat plate portion 63 is abutted against the first movable die 52a while being brought face-to-face with the first die 51 (the back side thereof). As a result, the cavity 54 is able to be formed between the first die 51 and the second die 52.

In this example embodiment, the resin foam material is able to be inhibited from leaking out of the passage portion 34 by closing the second movable die 52b and abutting the protruding portion 64 against the passage portion 34 (see FIGS. 4 and 7). Also at this time, there is a possibility that a portion of the cover 6S may deform inward (i.e., become recessed) toward the first die 51 (i.e., the seating side), due to the protruding portion 64 pressing excessively on the cover 6S. Therefore, in this example embodiment, the interposed member 40 that is less rigid than the cover 6S is interposed between the passage portion 34 and the protruding portion 64 (see FIGS. 6 and 7). At this time, the facing portion 42 (that is a less rigid portion) is arranged face-to-face with (i.e., covering) the passage portion 34. As a result, the pressing force of the protruding portion 64 is absorbed or the like by the interposed member 40 (a low rigidity member), thereby enabling inward deformation of the cover 6S to be inhibited. Thus, inward deformation of the cover 6S is able to be more reliably inhibited by arranging the facing portion 42 (a less rigid portion) face-to-face with the passage portion 34 at this time. Also, setting the diameter dimension L3 of the facing portion 42 larger than that of the passage portion 34 enables leakage of the resin foam material to be suitably inhibited.

After the resin foam material is injected into the cavity 54 from the second die 52, the resin foam material is expanded. Then when the resin foam material cures (i.e., hardens), the cover 6S is consequently able to be integrally attached to the surface of the cushion 6P, while the cushion 6P is formed. By inhibiting penetration of the resin foam material as much as possible by the second portion 32 at this time, the cushion 6P and the cover 6S are able to be suitably integrated, while maintaining the original property of the cover 6S to the greatest extent possible. Also, simultaneously with the forming of the cushion 6P, the flow path portion 20 is able to be formed in the cushion 6P by the second die 52 (i.e., the protruding portion 64). Also, in this example embodiment, the cushion 6P and the cover 6S are integrated while the interposed member 40 is interposed between the cushion 6P and the cover 6S (see FIG. 2).

Referring to FIG. 2, the blowing apparatus 10 is fixed to the frame member 6F while arranged in the cushion 6P (i.e., the accommodating portion). The blowing apparatus 10 is able to be communicated with the flow path portion 20 by connecting the blowing apparatus 10 to the flow path portion 20 via a duct member 28. Communicating the flow path portion 20 with the blowing apparatus 10 in this way makes it possible to blow air blown from the blowing apparatus 10 at an occupant via the flow path portion 20. In this example embodiment, the air that is blown from the blowing apparatus 10 flows from the flow path portion 20 through the interposed member 40 (i.e., the air flow hole 44), and is led to the cover 6S (i.e., the passage portion 34).

As described above, in this example embodiment, the cushion 6P is formed with the interposed member 40 that is less rigid than the cover 6S being interposed between the passage portion 34 and the protruding portion 64. Therefore, the cover 6S is able to be integrated with the cushion 6P that has the flow path portion 20, while inward deformation of the cover 6S is inhibited by the interposed member 40 (i.e., while improving performance). Also, in this example embodiment, the interposed member 40 has the facing portion 42 that is face-to-face with the passage portion 34. Also, the rigidity of the facing portion 42 is set comparatively low, which enables inward deformation of the cover 6S to be more reliably inhibited. Also in this example embodiment, the diameter dimension L3 of the facing portion 42 is set larger than that of the passage portion 34, so the facing portion 42 is able to more reliably cover the passage portion 34, thus suitably inhibiting the resin foam material from leaking out. As a result, localized hardening of the cover 6S due to leakage of the resin foam material is inhibited, so the performance of the cover 6S is able to be suitably maintained. Thus, according to this example embodiment, the cover 6S and the cushion 6P that has the flow path portion 20 are able to be integrated with good performance.

The vehicle seat of this example embodiment is not limited to the example embodiment described above. That is, other various example embodiments are also possible. In the example embodiment described above, the round cylindrical interposed member 40 is described, but it is not intended to limit the structure of the interposed member. The interposed member may have any of a variety of shapes other than circular when viewed from the front, such as elliptical or polyangular or the like. Also, the interposed member may have any of a variety of outer shapes other than a round cylindrical shape, such as a variety of columnar shapes or a spherical shape or the like. Also in the example embodiment described above, the facing portion 42 is provided on the interposed member 40, but the facing portion may also be omitted. Also in the example embodiment described above, the structure of the passage portion (i.e., shape, number, location and the like) is described, but it is not intended to limit the structure of the passage portion. Also in the example embodiment described above, the seat back 6 is described as an example, but the mode of the example embodiment may also be applied to a variety of seat structures such as the seat cushion 4.

What is claimed is:
1. A seat structure member comprising:
a cushion made of resin foam material;
a flow path portion of the cushion, through which air passes;
a cover that covers the cushion; and
an interposed member that is less rigid than the cover, wherein
the flow path portion is configured to allow air to pass toward the cover,
the cover has a breathable first portion arranged on a seating side of the seat structure member, a second portion that is laminated to the first portion and inhibits penetration of the resin foam material of the cushion, and a passage portion through which air passes that is provided on the second portion and
wherein the interposed member has a facing portion that is face-to-face with the passage portion, and a rigidity of the facing portion is set lower than that of another portion of the interposed member, excluding the facing portion.

2. The seat structure member according to claim 1, wherein the facing portion is larger than the passage portion.

3. The seat structure member according to claim 1, wherein the seat structure member is at least one of a seat cushion and a seat back.

4. The vehicle seat according to claim 1, wherein the second portion is disposed between the first portion and the interposed member.

5. The vehicle seat according to claim 1, wherein the facing portion of the interposed member is bowl-shaped.

6. The vehicle seat according to claim 1, wherein a diameter of the facing portion is larger than a diameter of the passage portion.

7. The vehicle seat according to claim 1, wherein an air hole is defined in a lower side of the facing portion.

8. The vehicle seat according to claim 7, wherein the air hole passes through the interposed member in a thickness direction, and the air hole is provided in a center of the facing portion.

9. A vehicle seat comprising:
a seat structure member; and
a blowing apparatus arranged on the seat structure member, wherein the seat structure member includes:
a cushion made of resin foam material;
a flow path portion of the cushion, through which air passes;
a cover that covers the cushion; and
an interposed member that is less rigid than the cover, wherein
the flow path portion is configured to allow air blown from the blowing apparatus to pass toward the cover, and
the cover has a breathable first portion arranged on a seating side of the seat structure member, a second portion that is laminated to the first portion and inhibits penetration of the resin foam material of the cushion, and a passage portion through which air passes that is provided on the second portion and
wherein the interposed member has a facing portion that is face-to-face with the passage portion, and a rigidity of the facing portion is set lower than that of another portion of the interposed member, excluding the facing portion.

10. The vehicle seat according to claim 9, wherein the facing portion is larger than the passage portion.

11. The vehicle seat according to claim 9, wherein the seat structure member is at least one of a seat cushion and a seat back.

12. The vehicle seat according to claim 9, wherein the second portion is disposed between the first portion and the interposed member.

13. The vehicle seat according to claim 9, wherein the facing portion of the interposed member is bowl-shaped.

14. The vehicle seat according to claim 9, wherein a diameter of the facing portion is larger than a diameter of the passage portion.

15. The vehicle seat according to claim 9, wherein an air hole is defined in a lower side of the facing portion.

16. The vehicle seat according to claim 15, wherein the air hole passes through the interposed member in a thickness direction, and the air hole is provided in a center of the facing portion.

* * * * *